United States Patent
Burmester et al.

(10) Patent No.: US 7,845,368 B2
(45) Date of Patent: Dec. 7, 2010

(54) DOUBLE SEAT VALVE

(75) Inventors: Jens Burmester, Grambek (DE);
Matthias Südel, Ratekau (DE)

(73) Assignee: Tuchenhagen GmbH, Büchen (DE)

(*) Notice: Subject to any disclaimer, the term of this patent is extended or adjusted under 35 U.S.C. 154(b) by 122 days.

(21) Appl. No.: 12/084,789

(22) PCT Filed: Apr. 1, 2006

(86) PCT No.: PCT/EP2006/002989
§ 371 (c)(1),
(2), (4) Date: May 9, 2008

(87) PCT Pub. No.: WO2007/054134
PCT Pub. Date: May 18, 2007

(65) Prior Publication Data
US 2009/0044874 A1   Feb. 19, 2009

(30) Foreign Application Priority Data

Nov. 12, 2005  (DE) .................. 10 2005 054 123
Nov. 25, 2005  (DE) .................. 10 2005 056 624
Dec. 12, 2005  (DE) .................. 10 2005 059 709

(51) Int. Cl.
*F16K 11/20* (2006.01)
*B08B 9/027* (2006.01)

(52) U.S. Cl. ............. 137/614.18; 137/240; 251/333

(58) Field of Classification Search ........ 137/15.06, 137/240, 614.18; 251/333
See application file for complete search history.

(56) References Cited

U.S. PATENT DOCUMENTS

| 4,257,442 | A | * | 3/1981 | Claycomb .................. 137/238 |
| 4,460,014 | A | * | 7/1984 | Mases et al. ............ 137/614.18 |
| 4,605,035 | A | * | 8/1986 | Rasmussen et al. ......... 137/240 |
| 5,645,102 | A | * | 7/1997 | Brackelmann et al. ...... 137/238 |
| 5,904,173 | A | * | 5/1999 | Ozawa ..................... 137/240 |
| 6,178,986 | B1 | * | 1/2001 | Burmester ................ 137/240 |
| 6,676,047 | B1 | * | 1/2004 | Lindholm Jensen et al. . 239/596 |

FOREIGN PATENT DOCUMENTS

| EP | 0 174 384 | 3/1986 |
| EP | 0 039 319 | 9/1997 |
| WO | 98/54494 | 12/1998 |

* cited by examiner

*Primary Examiner*—Kevin L Lee
(74) *Attorney, Agent, or Firm*—Merek, Blackmon & Voorhees, LLC (57) ABSTRACT

A double seat valve in which a second closing element (4), in its closed position, rests with a stopping surface (4f) on a face of its cylindrical projection (4*) directly upon a first seat (2a) and, together with a peripheral wall (4c, 4h), forms a second wraparound edge (U2) upon an interface (2e, 2e*). The peripheral wall (4c), at its end facing away from a first closing element (3), merges into a rotationally symmetric reversing surface (4d) that leads to a face (4e) of a recess (4b) oriented essentially perpendicular to the longitudinal axis of the second closing element (4). In meridian section, the reversing surface (4b) has a contour (K) with a bend-free curve, a direction vector in the leading point of the reversing surface (4d) points into a discharge borehole (3d, 3d*) central in the first closing element (3) without colliding with the first closing element (3) in the vicinity of its areas bordering the leakage cavity (5) and forming dynamic pressure.

27 Claims, 6 Drawing Sheets

DOUBLE SEAT VALVE

CROSS-REFERENCE TO RELATED APPLICATIONS

The present application claims the priority under 35 U.S.C. 119 of German Application Nos. 10 2005 054 123.2, filed Nov. 12, 2005; 10 2005 056 624.3, filed Nov. 25, 2005; and 10 2005 059 709.2, filed Dec. 12, 2005, which are hereby incorporated herein by reference in their entireties.

TECHNICAL FIELD

The invention relates to a double seat valve comprising two closing elements arranged in series and movable with regard to each other, which prevent in the closed position of the double seat valve the overflowing of fluids from one valve housing part into another one, which define both in the closed position and in the open position a leakage cavity between them, which is connected with the vicinity of the double seat valve, wherein, in the closed position, the first closing element formed as a valve piston is sealingly received in a connecting opening connecting the valve housing parts with each other and comes to rest sealingly at a second closing element associated with a second seat in the course of its opening movement, and the latter is also transferred to an open position in the further opening movement, wherein the first closing element comprises a first seal at its end section, which radially seals with regard to a cylindrical first seat formed in the connecting opening, wherein the second closing element comprises a recess at its end facing towards the first closing element with a substantially cylindrical peripheral wall aligned with the cylindrical first seat, and the recess is dimensioned in order to sealingly receive the end section and the radial first seal of the first closing element during the opening movement, before the second closing element opens, as well as further features according to the preamble of claim 1.

PRIOR ART

The prototype of a double seat valve comprising essential features of a double seat valve of the generic type, is known from EP 039 319 B1. These features include in particular that the first closing element comprises a seal at its end section, which seals radially with regard to a cylindrical first seat formed in the connecting opening (seal with sliding engagement), wherein the second closing element at its end facing towards the first closing element 3 comprises a recess with a substantially cylindrical peripheral wall aligned with the cylindrical first seat, and the recess is dimensioned in order to sealingly receive the end section and the radial seal of the first closing element during the opening movement, before the second closing element opens. The second closing element is formed as a seat disk therein, the seal of which purely axially acts upon the associated seat (seal with pressing engagement).

The known double seat valve according to EP 0 039 319 B1 is further developed by a double seat valve of the generic type, as it is known from WO 98 54 494 A1. The further development consists in that the double seat valve now has two so-called seat cleaning positions, wherein the first seat cleaning position is created by a first partial lift opposed to the opening lift. In this position the cylindrical lug arranged on the first closing element at the side of the leakage cavity forms a so-called choke gap with the associated cylindrical first seat, through which the cleaning media amount lead towards it from the adjacent first valve housing part can be restricted. The seat cleaning position of the second closing element is obtained by a second partial lift in the same direction as the opening lift, wherein in the partially open position the cylindrical lug arranged on the second closing element at the side of the leakage cavity forms a second choke gap with the associated part of the connecting opening, which restricts the amount of the second seat cleaning flow produced in this seat cleaning position.

In this know double seat valve, as opposed to the double seat valve according to EP 0 039 319 B1, the seal of the second closing element formed as a seat disk cooperates with a conical section of the associated seat, such that this can be described as an axially/radially acting seal (seal with sliding/pressing engagement). The second closing element is also guided and centred at this conical section. If the seals admit it, the conical section functions as a fixed (metal) stop for restricting the end position of the second closing element in the closed position of the double seat valve.

Since the two closing elements and the associated cylindrical lugs comprise different diameters, the respective associated sections of the connecting opening are also of different diameters such that a transition area is obtained between these two diameters. In the seat cleaning position of the first closing element the first seat cleaning flow flows along the cylindrical first seat, overflows the annular gap formed between the transition area and the cylindrical lug at the second closing element and continues along the first peripheral wall of the cylindrical recess in the second closing element, which is aligned with the cylindrical seat, wherein the difference in diameter of the two sections of the connecting opening prevents that the first seat cleaning flow directly hits the second choke gap and thereby the seat area of the second closing element.

The seat cleaning flow guided along at the cylindrical wall of the first seat and the following cylindrical peripheral wall in the seat cleaning position of the first closing element collides with the frontal boundary of the cylindrical recess, which is preferably oriented perpendicularly with regard to the aligned cylindrical surfaces. Such a right-angled diversion of the flow is unfavourable as a whole, it detaches from the wall in uncontrolled manner and produces turbulences and circulation flows, which can form impact pressure. In the known design the shape and dimension of the cylindrical first seat in the valve housing determine the shape and dimension of the recess in the second closing element in the area of the peripheral wall. For this reason, only restricted possibilities exist for the fluidic design of this area guiding and leading the seat cleaning flow.

In the seat cleaning position of the second closing element, the second seat cleaning flow at the transition area bridging the difference in diameter between the sections of the connecting opening is diverted radially inwards and guided past the upper frontal boundary face of the first closing element. Also in this case it is prevented thereby that the second seat cleaning flow directly hits the first choke gap and thereby the seat area of the first closing element.

With the known double seat valve it is possible to limit the amount of cleaning agent used in the respective seat cleaning as desired. However, the requirements to be satisfied by such a double seat valve in certain countries go beyond this. Thus it is demanded in the USA, for example, that in case of larger sealing deficiencies or even the loss of one of the two seat seals in the course of the seat cleaning of the other closing element, no cleaning agent may penetrate through the respective sealing deficiency or the seat area without seat seal, respectively. Under these conditions such a double seat valve is not only subject to the requirement of a restriction regarding the amount of cleaning agent and the avoidance of a direct admission of the seat areas in the course of the seat cleaning, but also of a discharge possibly free of turbulence of the seat cleaning flow into the leakage cavity at first and into the surrounding from there, without the respective closed seat area being directly hit by this seat cleaning flow or acted upon increasing pressure thereon.

Direct admission means each velocity component from the respective seat cleaning flow directed vertically onto the walls defining the seat area. Namely, it has been noted that each direct admission in this regard results in a conversion of kinetic energy of flow to static pressure. Depending on the impact angle of the flow onto the wall or housing surface flown against, a branching flow with a so-called "branching flow line" is obtained, the latter parting the flow into two halves. The branching flow line itself runs against the so-called "stagnation point" such that the velocity is zero at this point. The pressure increase as a result of this stopping of the velocity is also designated as "impact pressure". The above illustrated mechanisms increasing pressure generate, if they become effective, a leakage flow across the respective choke gap and the damaged or completely missing seat seal.

Therefore, direct hitting by the seat cleaning flow onto the surfaces defining the leakage cavity is counterproductive in any case. In the known double seat valve, the first seat cleaning flow, which is generated by lifting the first closing element by the first partial lift, can more or less perpendicularly impact onto the frontal boundary area of the cylindrical recess in the second closing element. The now required right-angled diversion of the flow detaches from the wall in uncontrolled manner, as already described above, and produces turbulences and circulation flows, which can form impact pressure. Critical in this connection is a formation of impact pressure in this regard at the inlet of the annular gap between the transition area of the frontal face of the cylindrical lug at the second closing element. This relatively large annular gap is obligatory in the known double seat valve, since the second closing element cannot firmly (metallically) abut in this area and in the area of the conical seat (correspondence) in equal measure.

In the seat cleaning of the second closing element the seat cleaning flow in this regard is directed by the conical transition area onto the front face of the first closing element in the direct vicinity of the annular gap between the cylindrical lug at the first closing element and the cylindrical first seat. Thereby, a point of impact for the seat cleaning flow exists at this end section of the first closing element and a branching flow line possibly resulting from this can generate a turbulence and an impact pressure there, if it has a branch into the annular gap indicated above.

It is the object of the present invention to further develop a double seat valve of the generic type such that a discharge possibly free of turbulence of the seat cleaning flow into and out of the leakage cavity is ensured and a direct admission of the seat areas increasing pressure is definitely avoided.

SUMMARY OF THE INVENTION

The object is achieved by a double seat valve comprising the features of claim 1. Advantageous embodiments of the double seat valve with cleanable seats according to the invention are described in the dependent claims.

The present invention is based on the basic features of the known double seat valve according to WO 98 54 494 A1 comprising the cylindrical lug arranged at the respective closing element on the side of the leakage cavity for the formation of the respective choke gap. Above that, the present invention uses the difference in diameter of these cylindrical lugs, which allows the formation of a transition area between the sections of different diameter of the connecting opening, which are associated with the cylindrical lugs.

In order to achieve the object forming the base of the present invention, a first inventive basic idea includes to lead the seat cleaning flow discharging from the associated choke gap in the respective seat cleaning process into the leakage cavity possibly free of turbulence and obstructions, and to discharge it from there into the surroundings in the same manner. This is achieved on the one hand by a new flow contour guiding and steering the seat cleaning flows in the leakage cavity. This new flow contour ensures in the seat cleaning of the first closing element arranged at the bottom that the first seat cleaning flow follows the wall shape in the area of the first seat free of detachment. Thereafter, a smooth diversion of this first seat cleaning flow occurs in the cylindrical recess of the second closing element aligned with the cylindrical first seat, such that the latter flow can arrive in a discharge bore centrally arranged in the first closing element without colliding and forming impact pressure thereby with the areas bounding the leakage cavity. This is achieved in that the peripheral wall of the cylindrical recess merges at its end facing away from the first closing element into a rotationally symmetrical diversion area and this diversion area opens in a front face of the recess oriented substantially perpendicular to the longitudinal axis of the second closing element.

Substantial is the smooth diversion of the seat cleaning flow in the diversion area. This is achieved according to the invention in that, viewed in vertical centre section, the diversion area comprises a contour with an unbent shape, wherein a directional vector in the outlet point of the diversion area points into a centric discharge bore arranged in the first closing element, without colliding and forming impact pressure with the first closing element in the region of its areas adjacent to the leakage cavity. It is further substantial that the peripheral wall of the cylindrical recess forms a second circumferential edge with the front face of the cylindrical lug at the second closing element, which is directly adjacent to the first seat in the closed position of the second closing element.

A second inventive basic idea includes, not to implement the limitation of the final position of the second closing element (slide piston with radially acting seal in sliding engagement or, if applicable, seat disk with radially/axially acting seal in sliding/pressing engagement or also, under certain conditions, seat disk with axially acting seal in pressing engagement) in its closed position at the seat area cooperating with the seal, as this is the case in the known double seat valve forming the generic type according to WO 98 54 494 A1, but to shift the desirable fixed (metal) stop of the second closing element, not implemented or not possible to implement in all cases, though, to the end of the associated choke gap facing away from the seal. This is achieved according to the invention in that the second closing element abuts in its closed position with a stop face, which is arranged at a front face of its cylindrical lug and forms the second circumferential edge with the circumferential wall, against the transition area, and that directly adjacent to the first seat. By this provision, which is unknown in the prior art, the gap existing up to now and located adjacent to the leakage cavity between the front face of the cylindrical lug at the second closing element and the valve housing corresponding thereto, of the transition area adjacent to the leakage cavity, is eliminated, which is a metal closure as a rule. Thus, cleaning agent cannot reach the second seat seal, which is damaged, if applicable, or completely missing, if applicable, in the course of the seat cleaning of the first closing element through the choke gap existing behind the contacting stop faces between the circumferential surface of the cylindrical lug at the second closing element and the cylindrical recess in the valve housing.

Such a closing of this critical gap was not possible up to now, since a redundancy in determination would have been present by the stop face in the seat area of the second seat seal. Substantial in the implementation of the second inventive idea is that the respective stop face at the second closing element and at the valve housing contact each other directly, along the complete circumference, and, as far as this is possible regarding fixed or metal contact, respectively, close to the leakage cavity. For this purpose, a sufficient central guiding of the second closing element in the valve housing and a sufficient centricity of all components participating in this guiding of the double seat valve is required.

In order to additionally counteract a wedging of the second closing element in the course of its closing movement, the end section of the second cylindrical lug is, according to an advantageous embodiment, configured radially on the outside following the stop face such that an annular circumferential centring point is formed. This centring point is, viewed in radial direction, shifted towards the outside as far as possible and as near as admissible approximated to the shape of the transition area defined by a radius of curvature. This is achieved by an annular circumferential second chamfer, which is provided at the end section and which extends against the stop face under an angle of chamfer and which forms, together with the second diameter of the second cylindrical lug, a third circumferential edge produced by rounding and ensuring the centring in the transition area.

In the flow guiding of the second seat cleaning flow generated by lifting the second closing element it is substantial that this flow detaches in defined manner at a first circumferential edge formed by the transition area and the first seat and is safely tangentially guided past the surfaces bounding the first closing element in the area of the leakage cavity. For this purpose, a safety distance is provided between the first circumferential edge and the possible areas of the first closing element, which prevents an impact in this regard under all possible functional conditions.

The safety distance of the first closing element from the directional vector at the exit point of the transition area into the first seat is preferably dimensioned such that it is at least as large as the sum of all manufacturing tolerances of the components forming the double seat valve, which determine in the closed position of the first closing element the smallest axial distance thereof to the transition area.

It has further proven beneficial with regard to avoiding any formation of impact pressure, if the first circumferential edge formed by the transition area and the first seat is rounded with the smallest possible corner rounding. In the ideal case a sharp-edged configuration was to be provided here, which is not admissible for functional and practical reasons (endangering the first seal), though.

According to a further proposal, the annular recess in the housing forms an obtuse or a vertical first diversion angle with the transition area, wherein the vertical diversion angle (90 degrees) is preferred, since a secure flow free of collision over the first closing element can be ensured most likely. In this, the transition between the recess and the transition area is rounded advantageously with a radius of curvature.

In order to obtain a smooth transition of the radial first seal from the cylindrical first seat into the cylindrical circumferential wall of the recess in the second closing element it is further proposed that the cylindrical circumferential wall leads into an insertion slope and the insertion slope forms the second circumferential edge with the stop face.

In order to avoid formation of impact pressure during the entry of the first seat cleaning flow into the diversion area of the second closing element, a further proposal envisions that the second circumferential edge formed by the stop face and the circumferential wall or the insertion slope, respectively, is rounded with a smallest-possible second corner rounding. A sharp-edged transition in this area is not admissible for functional and practical reasons, a relatively large radius of curvature is counterproductive and results in undesired formation of impact pressure.

In order to avoid that the first seat cleaning flow having left the diversion area flows against the front face of the recess and forms impact pressure thereby, it is further envisioned that the diversion area undercuts the front face by an axial undercutting distance. Thereby, the contour of the diversion area in the area of its outlet point can be pitched by a third diversion angle with regard to the front face of the cylindrical recess such that the first seat cleaning flow is slightly diverted towards the second closing element and can then follow the wall shape of the adjacent front face of the recess in order to clean it. It has been proven beneficial, if the third diversion angle is implemented in the range of 5 to 20 degrees, preferably with 15 degrees.

In terms of optimum flow guiding of the first seat cleaning flow, a contour has proven itself, which comprises a sequence of sections, wherein the first section, and the third and last section leading out of the front face are each embodied linearly, and wherein these sections are connected with each other through the second section, which rounds off the latter tangentially with the largest-possible radius of diversion.

A similarly satisfying flow result is achieved according to a further proposal in that the contour is made up of a sequence of bent sections, which each have a common tangent line at their respective transition points. Another embodiment envisions that the contour consists of a single section of continuously varied curvatures. Finally it is proposed as well that the contour is formed by a single section of constant curvature.

In order to ensure a perfect and disturbance-free discharge of the cleaning agent under all pressure and velocity conditions, it is envisioned that the discharge bore connects the leakage cavity with the vicinity of the double seat valve through connecting bores distributed across the circumference, and that the frontal boundary of the first closing element directed towards the leakage cavity comprises a chamfer circumferential on all sides and dropping towards the discharge bore.

In order to avoid formation of turbulence and impact pressure not only in the area of the seats of the double seat valve described above, it is advantageous, if any internal fittings or obstructions in the remaining leakage cavity are omitted, as far as this is constructively possible. In this regard a further proposal envisions that the discharge bore connects the leakage cavity with the vicinity of the double seat valve, and that the frontal boundary of the first closing element directed towards the leakage cavity comprises a chamfer circumferential on all sides and dropping towards the discharge bore. In this embodiment a first shifting rod connected with the first closing element concentrically penetrates a second shifting rod configured as a hollow rod and connected with the second closing element, continues flying through the discharge bore and is, at an end of the first closing element averted from the second closing element, fixedly connected with the first closing element through at least one substantially radially oriented traverse. Thereby the usual struts and other connecting means otherwise usual in the area of the leakage cavity are avoided and are relocated at an end located relatively far away from the leakage cavity, where they cannot have any disturbing influences on the flow guiding any more.

The chamfer indicated above of the front face of the first closing element directed towards the leakage cavity is suitably configured as an envelope of cone, which is sloped with regard to the base area of the cone in the range from 10 to 20 degrees, preferably 15 degrees.

In this connection it is also proposed that three traverses equally spaced across the circumference are firmly provided at a shifting rod section, which are each firmly connected radially on the outside with a circumferential ring, and that the shifting rod section, the traverses and the ring form an integral welding part.

In this it is further advantageous, when the welding part connects on the outside via the ring to a pressure balance piston bounding a section of the discharge bore remote from the leakage cavity and on the inside via the shifting rod section to the first shifting rod, and that the ring is enlarged in its inner diameter with regard to the diameter of the discharge bore with intermediate arrangement of a conically expanding transition area such that the inner passage of the discharge bore is not narrowed by the traverses.

As, based on the second inventive basic idea, the fixed (metal) stop face required in the prior art up to now in the seat area of the second closing element is omitted, more degrees of freedom for the configuration of the second closing element are now obtained in this area as opposed to known solutions. In principle, purely radially, radially/axially and, possible under certain conditions, also purely axially acting second seals can be provided.

The invention according to a first configuration envisions in this connection that the second seat is configured cylindrically and formed by the annular recess, and that the second closing element comprises a second seal, which radially seals against the second seat in sliding engagement. In order to facilitate the insertion of the second seal into the second seat, it is envisioned in this regard that the second seat comprises a chamfered edge expanding towards the second closing element for achieving a-smooth transition of the radial second seal. This chamfered edge is pitched with regard to the second seat by an angle of pitch, preferably in the range of 7.5 to 15 degrees, preferably with 10 degrees.

As the second seal experiences an elastic reshaping during extension from the chamfered edge, which has such an effect that it remains longer as desired in contact with the chamfered edge, which obstructs flow, a further proposal envisions that the chamfered edge expands at its end directed towards the second closing element into an opening slope, the latter being pitched with regard to the second seat by an opening angle preferably in the range of 35 to 55 degrees, preferably with 45 degrees. Thereby a desirable cross-section expansion is provided in the area of this chamfered edge such that the second partial lift required to ensure an unobstructed second seat cleaning flow can be reduced.

A second configuration relating to the second seat envisions that the second seat is embodied cone-shaped and inclined with regard to the cylindrical recess by a seat angle, and that the second closing element comprises a second seal, which seals axially/radially against the second seat in sliding/ pressing engagement. In this, the seat angle is set in the range between 25 and 35 degrees, preferably with 30 degrees. It is provided for the reduction of the second partial lift ensuring the second seat cleaning flow here as well that the second seat expands at its end directed towards the second closing element into an opening slope, wherein the latter is pitched with regard to the cylindrical recess by an opening angle as already quantified above.

It is proposed according to a third configuration that the second seat is arranged vertically to the longitudinal axis of the double seat valve and that the second closing element comprises a second seal, which seals axially against the second seat in pressing engagement. However, such a solution with the advantages of a purely axially acting seat and a purely axially acting seat disk is only possible, if the seal has such a ductile nature that the fixed and metal, if applicable, abutment of the second closing element with its stop face only against the transition area is ensured under all conditions.

SHORT DESCRIPTION OF THE DRAWINGS

Embodiment examples of the proposed double seat valve with cleanable seat according to the invention are illustrated in the drawing and are described below according to construction and function. It is shown in FIG. 1 in longitudinal section and detail the double seat valve with cleanable seats according to the invention in its seat area, illustrating its closed position.

DETAILED SPECIFICATION

The double seat valve 1 (FIG. 1) according to the invention consists substantially of the valve housing 10 comprising a first and a second valve housing part 1a and 1b, respectively, the two closing elements 3 and 4 moveable independently from each other with the associated shifting rods 3a and 4a, respectively, and a seat ring 2, which creates a connection between the valve housing parts 1a, 1b through a connecting opening 2c on the inside.

Figure 1:
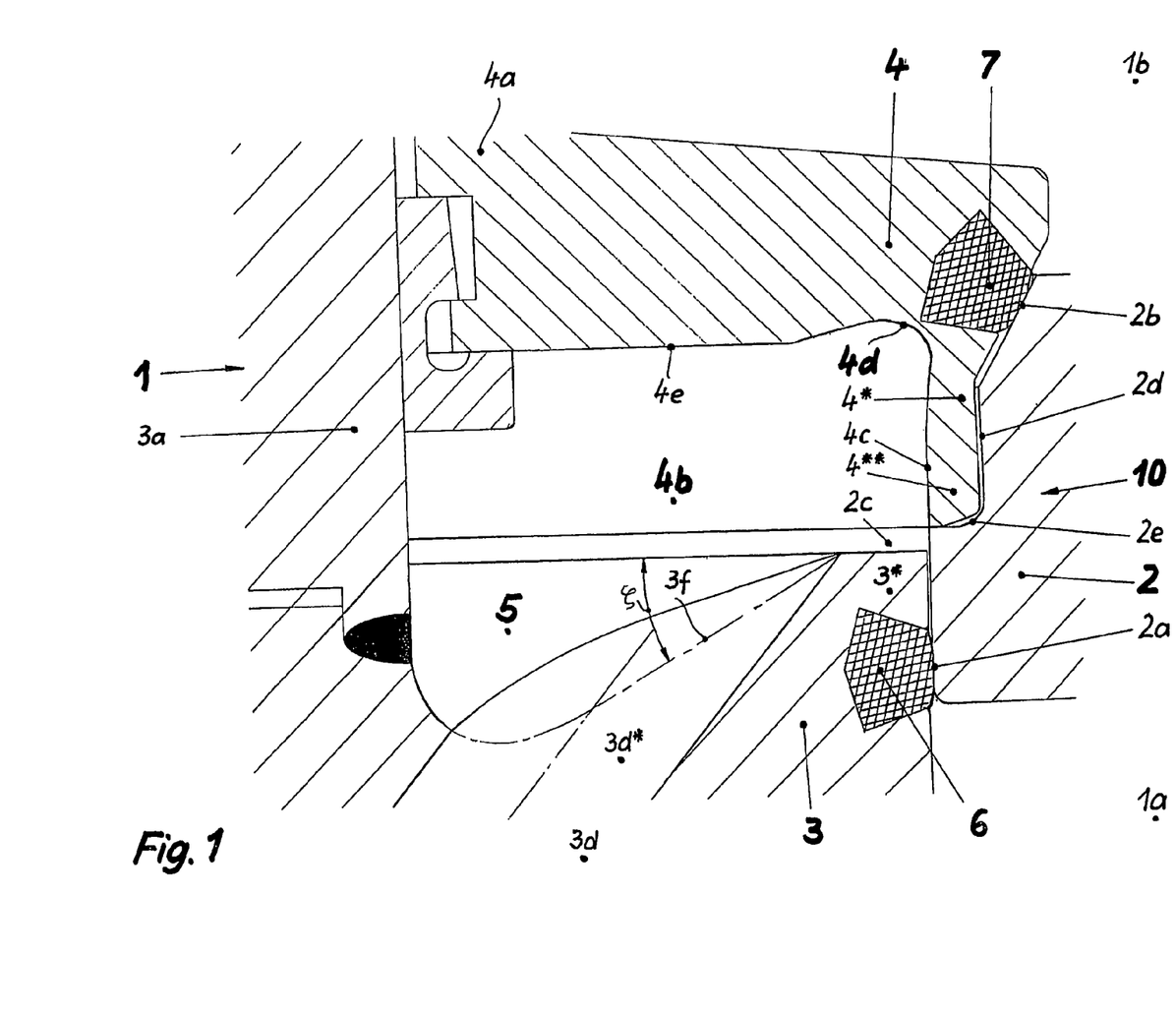

The first closing element 3 formed as a slide piston (active closing element) is received in sealing manner in the closed position of the double seat valve 1 in a first seat 2a formed by the connecting opening 2c, which is configured as cylindrical seat. For this purpose a first seal 6 is provided in the slide piston 3, which co-operates with the first seat 2a exclusively through radial bias (radial seal with sliding engagement). The second closing element 4 formed as a seat disk co-operates with a conical second seat 2b in the closed position of the double seat valve 1, which leads towards the first closing element 3 into a substantially annular recess 2d. The sealing occurs through a second seal 7, which seals axially/radially against the second seat 2b in sliding/pressing engagement.

Figure 3:
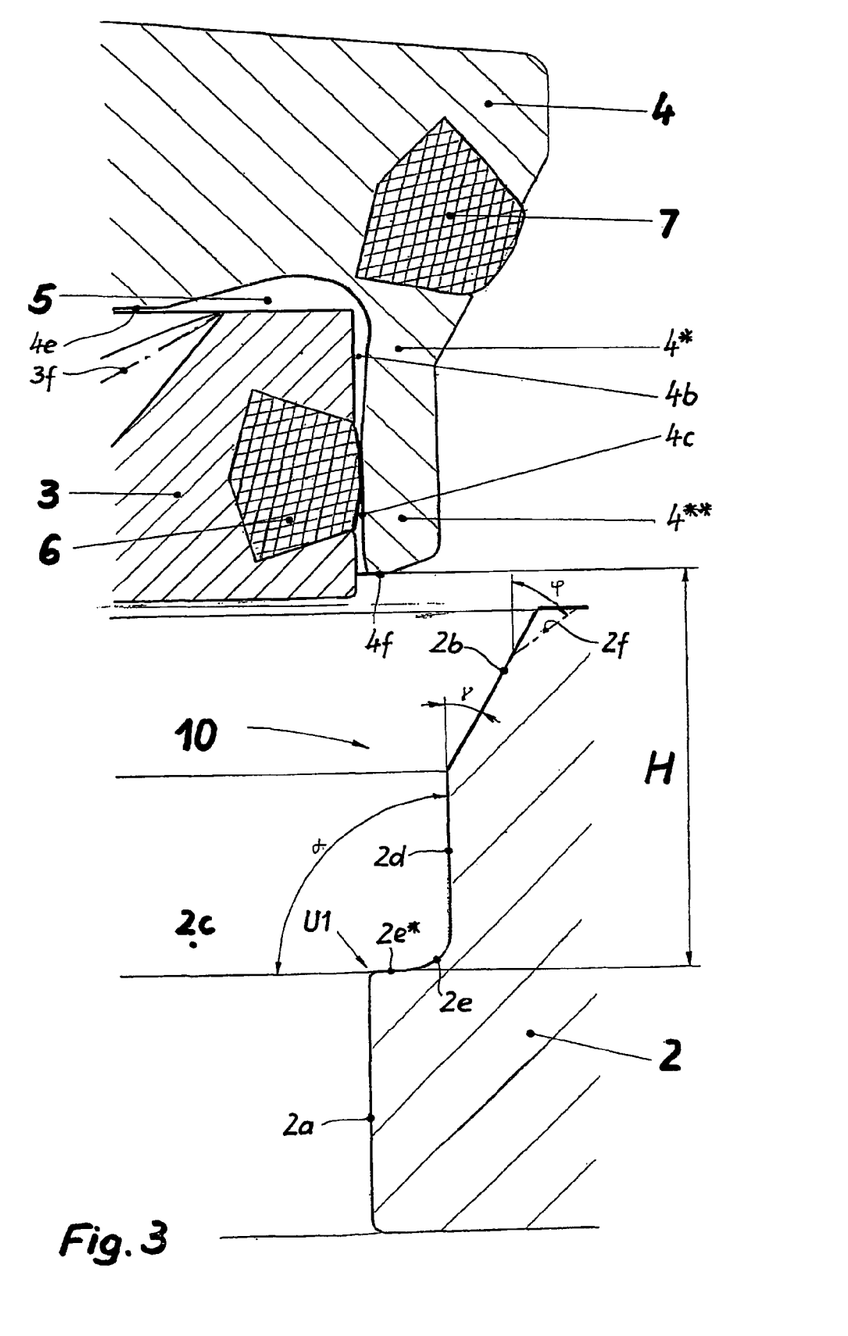
FIG. 3 in longitudinal section and detail the seat area and the two closing elements of the double seat valve according to FIG. 2, illustrating the open position of the double seat valve.

The two closing elements 3, 4 form a leakage cavity 5 between them in the illustrated closed as well as an open position (FIG. 3), which is connected with the surrounding of the double seat valve 1 through a discharge bore 3d, not illustrated, which centrally penetrates a connecting part 3b following the first closing element 3 and a pressure balance piston 3c continuing at the connecting part. (cf. also FIG. 6b)

Figures 6A, 6B:
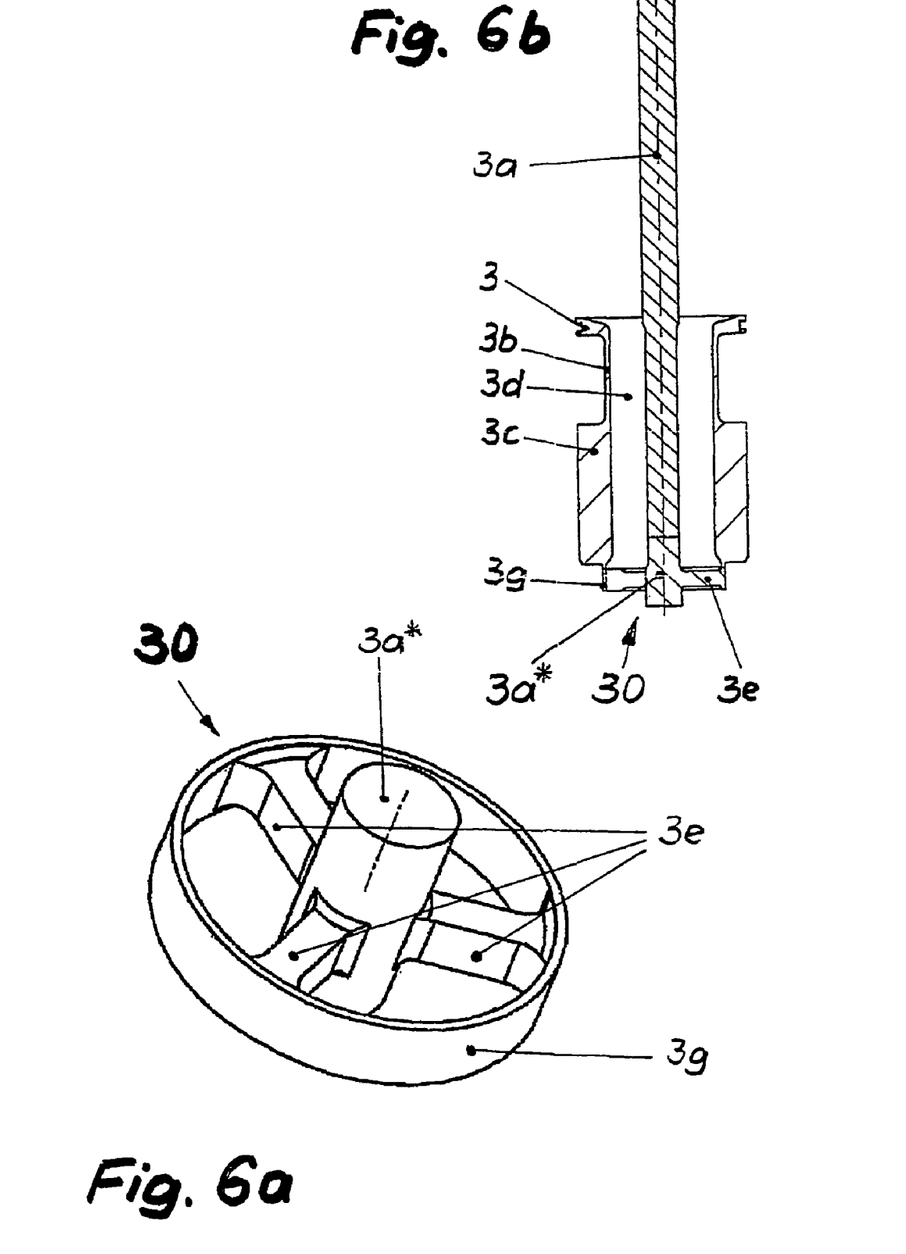
FIG. 6a in perspective illustration an integral welding part consisting of three traverses each fixedly connecting a shifting rod section with a ring, for connecting the first valve rod with a pressure balance piston arranged at the end of the first closing element remote from the leakage cavity.
FIG. 6b in vertical centre section the composite construction of the first closing element and indirectly adjacent pressure balance piston, welding part and first shifting rod.

As a rule, as shown in FIG. 1, the first shifting rod 3a is fixedly connected with the first closing element 3 in the area thereof through several webs penetrating the discharge bore 3d in star-shape and in radial direction. In the present case these webs are formed between connecting bores 3d*, which penetrate the closing element 3 spaced across the circumference and connect the discharge bore 3d with the leakage cavity 5. Since these webs between the connecting bores 3d* can have negative reactive effects on the flow conditions and the flow pattern in the leakage cavity 5, it is envisioned according to an advantageous embodiment in the double seat valve 1 according to the invention to shift these mechanically required connecting points in form of three traverses 3e equally spaced across the circumference by a certain distance away from the leakage cavity 5, preferably towards the end of the pressure balance piston 3c averted from the first closing element 3 (FIG. 6). The fixed connection with the latter piston occurs through a circumferential ring 3g, to which the traverses 3e are fixedly connected radial on the outside. Suitably the traverses 3e, the ring 3g and the shifting rod section 3a* are combined in an integral welding part 30 (FIG. 6a).

Each closing element 3, 4 comprises on the side of the leakage cavity a cylindrical lug 3* or 4*, respectively, which forms an annular first choke gap D1 (cf. also FIG. 4) or an annular second choke gap D2 (cf. also FIG. 5), respectively, with the associated part of the connecting opening 2c in the seat ring 2.

The second closing element 4 comprises at its end directed towards the first closing element 3 a recess 4b with a substantially cylindrical circumferential wall 4c flush with the cylindrical first seat 2a (FIG. 1). In this, this circumferential wall 4c is dimensioned such that it sealingly receives the end section 3* and the radial first seal 6 of the first closing element 3 in the course of the opening movement, before the second closing element 4 opens.

Figure 4:
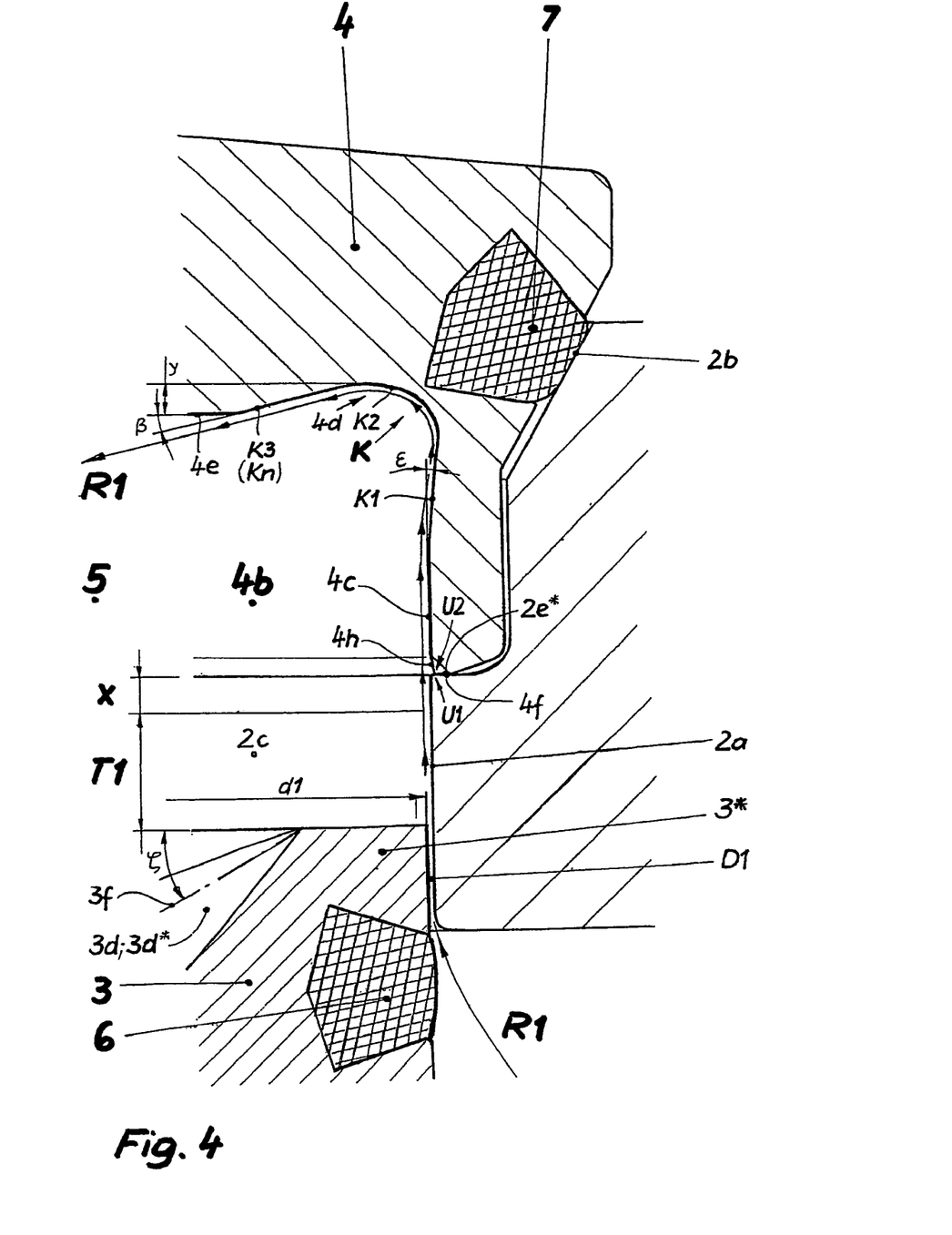
FIG. 4 in longitudinal section and detail the double seat valve according to FIG. 2, wherein the independently driven first closing element lying at the bottom and formed as a slide piston is in its seat cleaning position.
Figure 5:
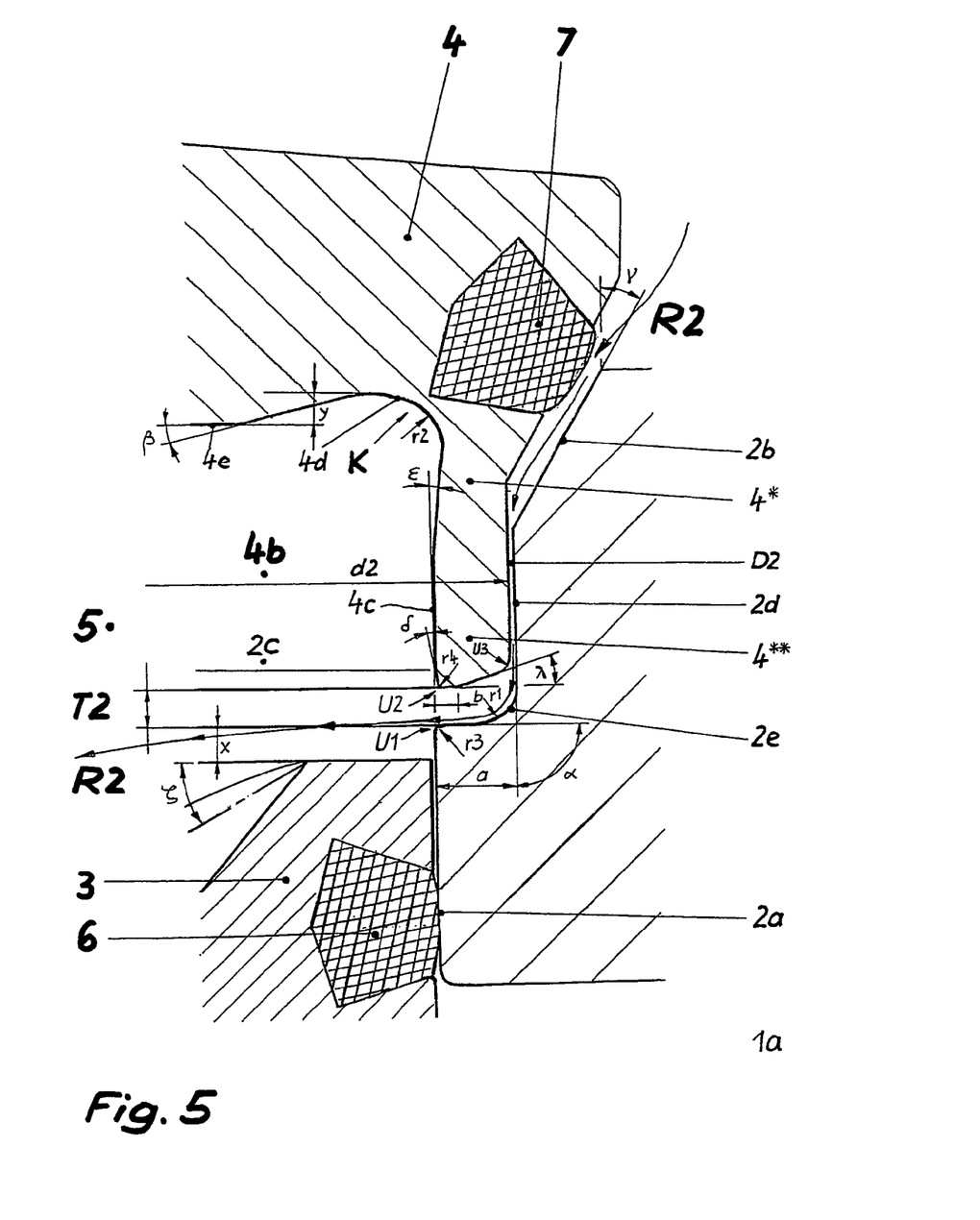
FIG. 5 in longitudinal section and detail the double seat valve according to FIG. 2, wherein the independently driven second closing element lying on top and formed as a seat disk is in its seat cleaning position.

The FIGS. 2 to 5 clarify in connection with FIG. 1 details of the seat area for the double seat valve 1. The first closing element 3 forms the first choke gap D1 with its cylindrical lug 3*(FIG. 2; FIG. 4), which has a first diameter d1, and with the associated first seat 2a of the connecting opening 2c. The second closing element 4 in the same manner forms the second choke gap D2 with its second cylindrical lug 4*(FIG. 1; FIG. 5), which has a second diameter d2, together with the annular, cylindrical recess 2d in the connecting opening 2c.

Figures 2, 2A:
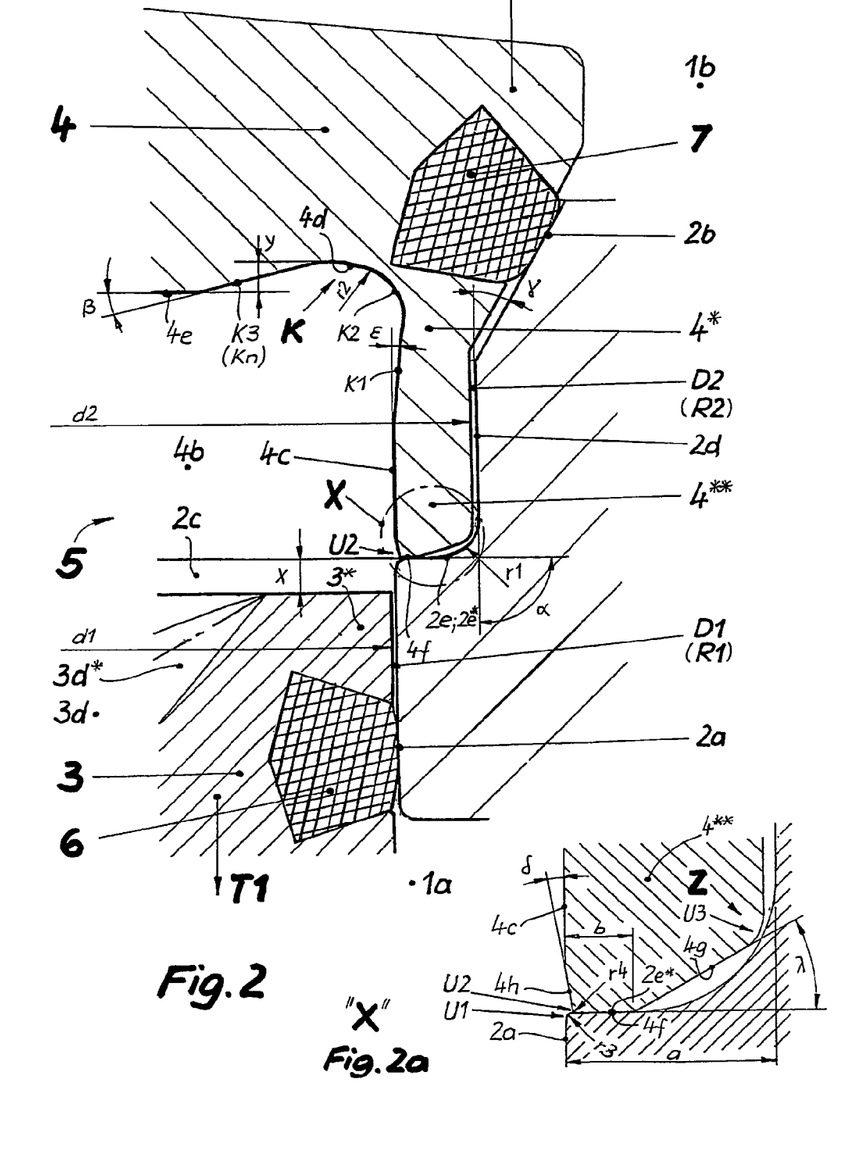
FIG. 2 in longitudinal section and detail an enlarged illustration of the seat area of the double seat valve according to FIG. 1.
FIG. 2a in enlarged illustration a cut-out from the seat area illustrated as detail "X" in FIG. 2.

The half of the difference in diameter between the annular recess 2d and the first seat 2a (FIG. 5; FIGS. 2 and 1) is designated with a. In this radial extension area a, the transition area 2e between the first seat 2a and the annular recess 2d is provided, wherein the end section of the transition area 2e leading into the first seat 2a forms a preferably vertical first diversion angle with the cylindrical circumferential surface of the annular recess 2d. In this, the annular recess 2d comprises in the connecting opening 2c a rounded transition configured with an angle of curvature r1 to the transition area 2e, r1 being configured with r1<a. The radial width a is configured such large that a seat cleaning flow R2 exiting from the second choke gap D2 into the leakage cavity 5 in the seat cleaning position of the second closing element 4 is diverted at the transition area 2e towards the centre of the leakage cavity 5 and securely across the first closing element 3. In order to ensure that the second seat cleaning flow R2 is not diverted too early towards the first closing element 3, a first circumferential edge U1 formed by the transition area 2e and the first seat 2a is rounded with the smallest-possible first corner rounding r3, whereby a defined flow break-off point is formed at this point.

It is ensured by this provision that the second seat cleaning flow R2 exiting from the second choke gap D2 is not directed onto the seat area of the first seal 6. Above that, the radial width a of the transition area 2e must also ensure the implementation of a stop face 2e* (FIG. 2; FIG. 2a) on the valve housing side for the second closing element 4, in order to be able to realise the second inventive basic idea, that is a fixed (metal) stop of the second closing element 4 directly adjacent to the leakage cavity 5 on the seat ring 2. The stop face 2e* on the valve housing side communicates with a stop face 4f provided at the front face of an end section 4** of the second cylindrical lug 4*(cf. FIG. 2a), which, viewed in radial direction, comprises a width b. The stop face 2e* on the valve housing side and the stop face 4f on the closing element side are each configured linear; the radius of curvature r1 of the transition area 2e connects tangentially to the stop face 2e* on the valve housing side.

The circumferential wall 4c of the cylindrical recess 4b in the second closing element 4 merges at its end averted from the first closing element 3 into a rotationally symmetric diversion area 4d (starting point of a contour (K)) (FIG. 2), and this diversion area 4d leads with a third diversion angle into a front face 4e of the recess 4b oriented substantially vertically towards the longitudinal axis of the second closing element 4. A second circumferential edge U2 formed by the circumferential wall 4c and the stop face 4f is located directly adjacent to the first seat 2a in the closed position of the second closing element 4 (FIG. 2a). Viewed in vertical centre section, the diversion area 4d has a contour K with unbent shape, wherein a first section K1 of the contour K adjacent to the circumferential wall 4c continues across further sections K2 and K3 (figure 2), and the direction vector in the end point of the last section K3 or Kn, respectively, points into the discharge bore 3d centrally arranged in the first closing element 3 or the connecting bores 3d*, respectively, without colliding with the first closing element 3 in the region of its areas bounding the leakage cavity 5.

In order to be able to guide a first seat cleaning flow R1 possibly tangentially past the front face 4e of the recess 4b without forming impact pressure (FIG. 4), the diversion area 4d undercuts the front face 4e by an axial undercutting distance y. A frontal boundary of the first closing element 3 directed towards the leakage cavity 5 comprises an axial safety distance x from the direction vector at the exit point of the transition area 2e into the first seat 2a, which is formed as the first circumferential edge U1 indicated above (FIGS. 2 and 5).

When in the open position of the double seat valve (FIG. 3) a complete opening lift H is implemented, it becomes apparent that the first seal 6 radially acting at the circumferential wall 4c of the recess 4b provides for a safe sealing of the two closing elements 3, 4 between the valve housing 10 on the one hand and the leakage cavity 5 on the other hand.

The FIGS. 2 and 2a clarify that the cylindrical circumferential wall 4c starts at its end directed towards the first closing element 3 with a inlet slope 4h, which is preferably implemented with an angle of pitch in the range from 5 to 15 degrees, and here again preferably with 15 degrees, and that the circumferential wall 4c merges into the first section K1 at its other end. The latter is angled radial outwardly with regard to the circumferential wall 4c under a second angle of diversion, said angle of diversion being smaller than 15 degrees.

Furthermore it is shown in the FIGS. 1 to 5 that the front face of the first closing element 3 is provided with a conical chamfer 3f declining towards the discharge bore 3d, said chamfer being preferably configured as an envelope of cone and being inclined with regard to the base of the cone by an angle of inclination ζ. This angle of inclination ζ is preferably configured in the range of 10 to 20 degrees and here again preferably ζ=15 degrees.

The first seat cleaning flow R1 exiting from the first choke gap D1 (FIG. 4) after implementation of the first partial lift T1 in the course of the seat cleaning of the first closing element 3 flows at first vertically along the first seat 2a, bridges the insertion slope 4h without detaching, follows the circumferential wall 4c and the following first section K1 angled under the second diversion angle also without detaching and enters smoothly into the further run of the diversion area 4b with its following sections K2 and K3, is diverted there in correspondence with the contour K, leaves the third and last section K3 (K3=Kn) with the third diversion angle tangents the front face 4e largely tangentially and finally reaches the area of the discharge bore 3d or the connecting bores 3d*, respectively.

In the FIGS. 2 and 4 the contour K with unbent extension is designated in details. The first section K1 and the third and last section K3 (K3=Kn) leading out of the front face 3c are each configured linear, and these sections K1 and K3 are connected with each other through a second section K2, which tangentially rounds-off the latter with the largest-possible diversion radius r2.

In order to ensure that the first seat cleaning flow R1 (FIG. 4) cannot form impact pressure at the second circumferential edge U2, the latter is directly adjacent to the first seat 2a in the closed position of the second closing element 4 and is rounded with the smallest-possible second corner rounding r4 (cf. also FIG. 2a).

A further configuration of the diversion area 4d envisions that the contour K consists of a sequence of bent sections K1 to Kn (for example arc of circle, ellipses, parabolas, hyperbolas), which each have a common tangent at their respective transition points. According to another configuration, the contour K is formed by a single section of continuously varying curvature (for example spiral or another mathematically closed describable shape of curvature). According to a further proposal, the contour K is configured with a single section having a constant curvature (for example a single arc of circle with the required tangential entry and exit under the second diversion angle or the third diversion angle respectively).

The end section 4** of the second cylindrical lug 4* (FIGS. 2 and 2a) comprises an annular circumferential second chamfer 4g on the front side radially outside following the stop face 4f, which extends against the stop face 4f under an angle of chamfer. The circumferential penetration area formed by the second chamfer 4g and the circumferential surface of the second cylindrical lug 4* at the second diameter d2 is formed like a rounded third circumferential edge U3. The angle of chamfer is dimensioned such that the third circumferential edge U3, viewed in radial direction, is shifted outwards as far as possible and guided as near as admissible towards the shape of the transition area 2e determined by the radius of curvature r1 and forms an annular circumferential centring point Z with said area there. Thereby, the second closing element 4 is in any case sufficiently coaxially centred just before the insertion into its abutment position such that the first and the second circumferential edge U1, U2 communicate in the required manner, also if unintended wedging of the second closing element 4 should occur due to deficient guiding at the guiding points intended according to plan for this purpose.

The end on the leakage cavity side of the second choke gap D2 designated in FIG. 5 is largely tightly closed (as far as this is generally possible in case of abutment of metal against metal) by the abutment position indicated above (cf. FIG. 4) of the second closing element 4 at the stop face 2e* on the valve housing side. Cleaning liquid of the first seat cleaning flow R1 cannot enter into the second choke gap D2 and thus into the area of the second seal 7 any more. Even in case of high damage or complete removal of the second seal 7, if applicable, a penetration for cleaning liquid is not possible any more.

According to FIG. 5 the second closing element 4 assumes its second seat cleaning position after implementation of a second partial lift T2. In this, the second seal 7 is spaced from the second seat 2b by a gap, and the second cylindrical lug 4* forms the second choke gap D2 together with the annular recess 2d, through which the second seat cleaning flow R2 can be approximated to the exposed second seat 2b, across which it can flow now, and led into the leakage cavity 5. The second seat 2b is configured conically or cone-shaped, respectively, and the second closing element 4 comprises the second seal 7, which according to FIG. 2 (closed position) seals axially/radially against the second seat 2b in gliding/pressing engagement. The conically or cone-shaped configured second seat 2b is inclined with regard to the cylindrical recess 2d by a seat angle, which is configured in the range from 25 to 35 degrees, preferably with 30 degrees. An opening slope 2f (cf. FIG. 3) for the second seal 7 is not required in this case; it can be provided at the end of the second seat 2b directed towards the second closing element 4, however. The opening slope 2f is pitched with regard to the cylindrical recess 2d by an opening angle in the range from 35 to 55 degrees, preferably with =45 degrees.

An advantageous embodiment in the area of the second seat 2b envision's to configure the latter cylindrical, wherein is it formed directly by the annular recess 2d. This embodiment ensures in outstanding manner that the second closing element 4 abuts in its closed position with the stop face 4f arranged at the front face of its cylindrical lug 4* only at the transition area 2e or the stop face 2e* on the valve housing side. If the second seat 2b is configured cylindrical, the second seal 7 radially seals there in sliding engagement.

If the second seat 2b is configured cylindrical (not illustrated in the figures), an insertion slope protecting the seal into this cylindrical seat is of particular advantage. This insertion slope is embodied suitably in form of a chamfered edge expanding towards the second closing element 4 in order to achieve a smooth transition of the radial second seal 7. The chamfered edge is pitched with regard to the second seat by an angle of pitch in the range of 7.5 to 15 degrees, preferably with 10 degrees. In order to reduce the second partial lift T2 required for the exposure of the cylindrical second seat 2b, the chamfered edge expands according to further proposal at its end directed towards the second closing element 4 into an opening slope 2f (analogously to the embodiment according to FIG. 2), wherein the latter is pitched with regard to the second seat 2b by an opening angle preferably in the range from 35 to 55 degrees, and here again preferably with =45 degrees.

The double seat valve 1 according to the invention also allows a design of the second seat 2b perpendicular to its longitudinal axis, wherein the second seal 7 arranged in the second closing element 4 seals axially against this second seat 2b in pressing engagement (not illustrated in the figures). However, this solution is only possible, if the axially acting second seal 7 is ductile such that the abutment position of the second closing element 4 at the stop face 2e* on the valve housing side in the area of the transition area 2e leading into the first seat 2a is still ensured.

The second seat cleaning flow R2 exits the second choke gap D2 (FIG. 5) at first along the annular recess 2d and is diverted through the transition area 2e towards the centre of the leakage cavity 5. An immediate and direct splashing of the seat area of the first seal 6 is safely prevented thereby. The first closing element 3 is axially positioned during the seat cleaning of the second closing element 4 such that the second seat cleaning flow R2 can flow across the first closing element 3 unimpeded. Depending on the prevailing pressure conditions and under the influence of gravity, when the double seat valve 1 is arranged according to the position in the drawing, the liquid jet assumes a slightly parabola-shaped course such that it flows tangentially over the front face of the first closing element 3 with its chamfer 3, which is desirable for reasons of cleaning technique. By this flow guiding and positioning of the first closing element 3 even a suction effect on the seat area of the first seal 6 is achieved such that both in case of loss or considerable damage of the first seal 6 no cleaning agent can enter into the adjacent first valve housing part 1a. The first circumferential edge U1 formed by the transition area 2e and the first seat 2a, which is rounded-off with the smallest-possible corner rounding r3, promotes a detachment of the seat cleaning flow R2 at the first circumferential edge U1 and prevents a flow forming impact pressure against the ring gap leading to the first seal 6 by this seat cleaning flow R2 or by a partial flow thereof.

In FIG. 6a the integral welding part 30 is illustrated, which is formed by the shifting rod section 3a*, the three traverses 3e and the ring 3g. The three traverses 3e arranged equally spaced across the circumference of the shifting rod section 3a* are fixedly connected therewith. They are each radially on the outside fixedly connected with the circumferential ring 3g as well. The welding part 30 is welded on the outside via the ring 3g to the pressure balance piston 3c bounding the section of the discharge bore 3d remote from the leakage cavity (cf. FIG. 6b) and on the inside via the shifting rod section 3a* to the first shifting rod 3a. In this, the ring 3g is enlarged in its inner diameter with regard to the diameter of the discharge bore 3d with interposition of a conically expanding transition area such that the inner passage of the discharge bore 3d is not narrowed by the traverses 3e.

LIST OF REFERENCE NUMBERS OF THE USED ABBREVIATIONS

1 Double seat valve
10 Valve housing
1a First valve housing part
1b Second valve housing part
2 Seat ring
2a First seat (cylindrical seat)
2b Second seat (axial; radial; axial/radial)
2c Connecting opening
2d Annular recess
2e Transition area
2e* Stop face on valve housing side
2g Opening slope
3 First closing element (slide piston)
3* First cylindrical lug
3a First shifting rod
3b Connecting part
3c Pressure balance piston
3d Discharge bore
3d* Connecting bore
3f Chamfer
30 Welding part
3a* Shifting rod section
3e Traverse
3g Ring
4 Second closing element
4* Second, cylindrical lug
4** End section
4a Second shifting rod
4b Recess
4c Circumferential wall
4d Diversion area
4e Front face
4f Stop face (on closing element side)
4g Second chamfer
4h Insertion slope
5 Leakage cavity
6 First seal (radial)
7 Second seal (axial; radial; axial/radial)
a Radial width of the transition area
b Width (stop face on closing element side at end section 4**)
d1 First diameter
d2 Second diameter
r1 Radius of curvature (of the transition area 2e)
r2 Diversion radius
r3 First corner rounding (on housing side, seat ring 2)
r4 Second corner rounding (second closing element 4)
x Axial safety distance
y Axial undercutting distance
First angle of diversion
Third angle of diversion
Seat angle
Angle of pitch (of the insertion slope 4h)
Second angle of diversion
ζ Angle of inclination
Angle of chamfer
Opening angle
D1 First choke gap
D2 Second choke gap
H Complete opening lift (completely open position)
K Contour of the diversion area 4b
K1 First section (first straight line)
K2 Second section (bent contour)
K3 Third section (second linear line)
Kn Last section
R1 First seat cleaning flow
R2 Second seat cleaning flow
T1 First partial lift (first partially open position/first seat cleaning position)
T2 Second partial lift (second partially open position/second seat cleaning position).
U1 First circumferential edge
U2 Second circumferential edge
U3 Third circumferential edge
Z Centring point

The invention claimed is:

1. Double seat valve comprising two valve housing parts (1a, 1b) and first and second closing elements (3, 4) arranged in series and movable with regard to each other, which prevent in a closed position of the double seat valve (1) fluids from one of the valve housing parts (1a; 1b) flowing into the other of the valve housing parts (1a, 1b), which define in the closed position, as well as in the open position, a leakage cavity (5) between them, which is connected with the surroundings of the double seat valve (1), wherein in the closed position the first closing element (3), which is formed as a slide piston, is received in sealing manner in a connecting opening (2c) connecting the valve housing parts (1a, 1b) with each other and which comes to abut, in a sealing manner in the course of its opening movement, the second closing element (4), which is associated with a second seat (2b), and the latter element is also transferred to an open position (H) during a further opening movement, the first closing element (3) comprising a first seal (6) at its end section (3*), which seals radially against a cylindrical first seat (2a) formed in the connecting opening (2c), the second closing element (4) comprising at its end facing towards the first closing element (3) a recess (4b) with a substantially cylindrical peripheral wall (4c) aligned with the cylindrical first seat (2a), and the recess being dimensioned in order to sealingly receive the end section (3*) and the radial first seal (6) of the first closing element (3) during the opening movement, before the second closing element (4) opens, each of the closing elements (3, 4) being able to be transferred independently from the other by a partial lift to a seat cleaning position in order to rinse its respective coaxial seat (2a, 2b), wherein the second closing element (4) can be transferred to its seat cleaning position by a second partial lift (T2) in the same direction as the opening movement and the first closing element (3) can be transferred to its seat cleaning position by a first partial lift (T1) in the direction opposed to the opening movement, a cylindrical lug (3*, 4*) being arranged at each closing element (3, 4) on the leakage cavity side, which forms an annular choke gap (D1, D2) with the associated connecting opening (2c), the first seat (2a) having a diameter that is smaller than the diameter of an annular recess (2d) associated with the second closing element (4) in the connecting opening (2c), and a transition surface (2e) between the first seat (2a) and the annular recess (2d), characterised in that the second closing element (4) abuts in its closed position with a stop face (4f) arranged at a front face of the cylindrical lug (4*), which forms a second circumferential edge (U2) with the circumferential wall (4c; 4h), against the transition surface (2e; 2e*), and that directly adjacent to the first seat (2a), the circumferential wall (4c) at its end averted from the first closing element (3) merges into a rotationally symmetrical diversion area (4d) for a flow of cleaning fluid that has passed the first seat (2a), and this diversion area (4d) leads into a front face (4e) of the recess (4b) oriented substantially perpendicular to the longitudinal axis of the second closing element (4), and that, viewed in vertical center section, the diversion area (4d) comprises the contour (K) with an uncurved portion, wherein, in the seat cleaning position of the first closing element (3), a flowpath of a seat cleaning flow past the cylindrical first seat (2a) is directed into a flow inlet of the diversion area (4d), and a direction vector of a flow outlet of the diversion area (4d) points into a central discharge bore (3d; 3d*) arranged in the first closing element (3), without colliding with the first closing element (3) in the region of its areas bounding the leakage cavity (5) and without forming impact pressure.

2. Double seat valve according to claim 1, wherein a frontal boundary of the first closing element (3) directed towards the leakage cavity (5) has an axial safety distance (x) from a direction vector at an exit of the transition area (2e) formed as a first circumferential edge (U1) into the first seat (2a).

3. Double seat valve according to claim 2, wherein the safety distance (x) is at least as large as the sum of all production tolerances of the components of the double seat valve (1), which determine in the closed position of the first closing element (3) the smallest axial distance thereof to the transition area (2e).

4. Double seat valve according to claim 1, wherein the first circumferential edge (U1) formed by the transition area (2e) and the first seat (2a) is rounded with the smallest-possible first corner rounding (r3).

5. Double seat valve according to claim 1, wherein the annular recess (2d) forms an obtuse or a right first diversion angle ($\alpha$) with the transition area (2e).

6. Double seat valve according to claim 5, wherein the recess (2d) comprises a rounded transition configured with a radius of curvature (r1) to the transition area (2e).

7. Double seat valve according to claim 1, wherein the cylindrical circumferential wall (4c) leads into an insertion slope (4h) in order to achieve a smooth transition of the radial first seal (6), and the insertion slope (4h) forms a second circumferential edge (U2) with the stop face (4f).

8. Double seat valve according to claim 1, wherein the second circumferential edge (U2) is rounded with a smallest possible second corner rounding (r4).

9. Double seat valve according to claim 1, wherein the diversion area (4d) undercuts the front face (4e) by an axial undercutting distance (y).

10. Double seat valve according to claim 1, wherein the contour (K) comprises a sequence of sections (K1, K2, ..., Kn), that the first section (K1) and the third and last section (K3=Kn) leading out of the front face (4e) are each configured linear, and that these sections (K1, K3) are connected with each other through the second section (K2), which tangentially rounds the latter with a largest-possible diversion radius (r2).

11. Double seat valve according to claim 1, wherein the contour (K) comprises a sequence of bent sections (K1, K2, K3, ..., Kn), which each have a common tangent at their respective transition points or that the contour (K) comprises a single section of continuously varying curvatures or that the contour (K) comprises a single section with constant curvature.

12. Double seat valve according to claim 1, wherein the direction vector of the last section (Kn) comprises a third diversion angle ($\beta$) with regard to the front face (4e) preferably in the range of $5 \geq \beta \geq 20$ degrees, preferably $\beta=15$ degrees.

13. Double seat valve according to claim 1, wherein the discharge opening (3d*) connects the leakage cavity (5) with the surrounding of the double seat valve (1) through connecting bores (3d*) spaced around the circumference, and that the frontal boundary of the first closing element (3) directed towards the leakage cavity comprises a chamfer (3f) dropping circumferentially on all sides towards the discharge bore (3d*).

14. Double seat valve according to claim 1, wherein the discharge bore (3d*) connects the leakage cavity (5) with the surrounding of the double seat valve (1), that the frontal boundary of the first closing element (3) directed towards the leakage cavity (5) comprises a chamfer (3f) dropping circumferentially on all sides towards the discharge bore (3d), and that a first shifting rod (3a) connected with the first closing element (3) concentrically penetrates a second shifting rod (4a) connected with the second closing element (4) and configured as a hollow rod, continues flying through the discharge bore (3d) and is firmly connected with the first closing element at an end of the first closing element (3) averted from the second closing element (4) through a substantially radially oriented traverse (3e).

15. Double seat valve according to claim 14, wherein the chamfer (3f) is configured as an envelope of cone.

16. Double seat valve according to claim 15, wherein the envelope of cone is inclined with regard to the base of the cone by an angle of inclination ($\zeta$) preferably in the range of $10 \leq \zeta \leq 20$ degrees, preferably $\zeta = 15$ degrees.

17. Double seat valve according to claim 16, wherein three traverses (3e) arranged equally spaced across the circumference are fixedly provided at a shifting rod section (3a\*), which are each fixedly connected on the radial outside with a circumferential ring (3g), and that the shifting rod section (3a\*), the traverses (3e) and the ring (3g) form an integral welding part (30).

18. Double seat valve according to claim 17, wherein the welding part (30) connects on the outside through the ring (3g) to a pressure balance piston (3c) bounding a section of the discharge bore (3d) remote from the leakage cavity and on the inside through the shifting rod section (3a\*) to the first shifting rod (3a), and that the ring (3g) is enlarged in its inner diameter with regard to the diameter of the discharge bore (3d) with interposition of a conically expanding transition area such that the inner passage of the discharge bore (3d) is not narrowed by the traverses (3e).

19. Double seat valve according to claim 1, wherein the second seat (2b) is configured cylindrical and formed by the annular recess (2d), and that the second closing element (4) comprises a second seal (7), which seals radially against the second seat (2b) in sliding engagement.

20. Double seat valve according to claim 19, wherein the second seat (2b) comprises a chamfered edge expanding towards the second closing element (4) for achieving a smooth transition of the radial second seal (7).

21. Double seat valve according to claim 20, wherein the chamfered edge is pitched with regard to the second seat (2b) by an angle of pitch preferably in the range of 7.5 to 15 degrees, preferably 10 degrees.

22. Double seat valve according to claim 20, wherein the chamfered edge expands at its end directed towards the second closing element (4) into an opening slope (2f), the latter being pitched with regard to the second seat (2b) by an opening angle preferably in the range of 35 55 degrees, preferably 45 degrees.

23. Double seat valve according to claim 1, wherein the second seat (2b) is configured conical and is inclined with regard to the cylindrical recess (2d) by a seat angle ($\gamma$), and that the second closing element (4) comprises a second seal (7), which seals axially/radially against the second seat (2b) in sliding/pressing engagement.

24. Double seat valve according to claim 23, wherein the seat angle ($\gamma$) is configured in the range of $25 \leq \gamma \leq 35$ degrees, preferably $\gamma = 30$ degrees.

25. Double seat valve according to claim 23, Wherein the second seat (2b) expands at its end directed towards the second closing element (4) into an opening slope (2f), the latter being pitched with regard to the cylindrical recess (2d) by an opening angle ($\phi$), preferably in the range of $35 \leq \phi \leq 55$ degrees, preferably with $\phi = 45$ degrees.

26. Double seat valve according claim 1, wherein the second seat (2b) is arranged vertically to the longitudinal axis of the double seat valve (1), and that the second closing element (4) comprises a second seal (7), which seals axially against the second seat (2b) in pressing engagement.

27. Double seat valve according to claim 1, wherein an end section (**4\*\*) of the second cylindrical lug (4\*) comprises an annular circumferential second chamfer (4g) radially on the outside following the stop face (4f), which extends from the stop face ((4f) at a chamfer angle ($\lambda$), and which is dimensioned such that a third circumferential edge (U3) formed by rounding between the second chamfer (4g) and the second diameter (d2) of the second cylindrical lug (4\*) is shifted, viewed in radial direction, outwards as far as possible and as close as admissible to the shape of the transition area (2e**) determined by the radius of curvature (r1) and forms an annular circumferential centering point (Z) there.

* * * * *